United States Patent
Schuettenberg

(10) Patent No.: US 7,527,278 B2
(45) Date of Patent: May 5, 2009

(54) METHOD FOR SECURING AXLE TO FRAME FOR NON-SELF PROPELLED TRANSPORT

(75) Inventor: Donald W. Schuettenberg, Antioch, IL (US)

(73) Assignee: ATC Leasing Company LLC, Pleasant Prairie, WI (US)

( * ) Notice: Subject to any disclaimer, the term of this patent is extended or adjusted under 35 U.S.C. 154(b) by 167 days.

(21) Appl. No.: 11/618,406

(22) Filed: Dec. 29, 2006

(65) Prior Publication Data

US 2008/0157505 A1 Jul. 3, 2008

(51) Int. Cl.
*B62D 53/04* (2006.01)

(52) U.S. Cl. ............... 280/402; 280/403; 280/480; 414/563

(58) Field of Classification Search ........... 280/402, 280/403, 480, 86.5, 43; 410/9, 22, 3, 4, 19, 410/24; 414/563; 188/26, 36, 32, 5, 4 R; 180/209

See application file for complete search history.

(56) References Cited

U.S. PATENT DOCUMENTS

| | | | | |
|---|---|---|---|---|
| 2,969,993 A * | 1/1961 | Jasper | ............ | 280/433 |
| 4,269,426 A * | 5/1981 | Bhushan | ............ | 280/432 |
| 4,555,214 A | 11/1985 | Morton | | |
| 4,657,468 A * | 4/1987 | Youmans et al. | ............ | 414/563 |
| 4,867,468 A * | 9/1989 | Paul et al. | ............ | 280/402 |
| 4,949,985 A * | 8/1990 | Lichter | ............ | 280/402 |
| 5,163,803 A * | 11/1992 | Marola | ............ | 414/563 |
| 5,214,944 A * | 6/1993 | Wolthoff | ............ | 70/226 |
| 5,427,210 A * | 6/1995 | Willaford | ............ | 188/32 |
| 5,888,039 A * | 3/1999 | Cooley | ............ | 410/50 |
| 5,904,364 A * | 5/1999 | Wylezinski et al. | ......... | 280/401 |
| 5,984,614 A * | 11/1999 | Weber | ............ | 414/498 |
| 6,116,062 A * | 9/2000 | Markegard et al. | ............ | 70/19 |
| 6,120,051 A * | 9/2000 | Lichter et al. | ............ | 280/402 |
| 6,345,693 B1 * | 2/2002 | Yeo et al. | ............ | 187/211 |
| 6,491,490 B1 * | 12/2002 | Trobee | ............ | 414/563 |
| 7,070,219 B1 * | 7/2006 | Kelly | ............ | 294/81.5 |
| 7,232,004 B2 * | 6/2007 | Bartel | ............ | 180/292 |
| 7,232,138 B2 * | 6/2007 | Shubert | ............ | 280/79.4 |
| 7,422,225 B2 * | 9/2008 | Troha et al. | ............ | 280/403 |
| 2005/0220598 A1 * | 10/2005 | Shubert | ............ | 414/563 |
| 2008/0240881 A1 * | 10/2008 | Fischer | ............ | 410/3 |

* cited by examiner

*Primary Examiner*—Paul N Dickson
*Assistant Examiner*—Tashiana Adams
(74) *Attorney, Agent, or Firm*—Vorys, Sater, Seymour and Pease, LLP; William H. Oldach, III

(57) ABSTRACT

A method for transporting vehicles is disclosed. The method uses relatively light weight, flexible webbing atop the truck frame in place of hardwood timbers presently used. The advantage is that the timbers need not be transported back to the truck factory or dealership for reuse, only the chains and webbing need to be returned. Thus, it is easier and more economical to return the towing equipment for re-use for the next shipment of trucks. Protective material may be placed atop the truck frame to protect the webbing from sharp corners or edges of the truck frame. Chains may be used on either side of the intermediate axle to attach to the webbing. In one embodiment, sturdy strapping or other materials may be used on either side of the intermediate axle to attach to the webbing.

21 Claims, 4 Drawing Sheets

METHOD FOR SECURING AXLE TO FRAME FOR NON-SELF PROPELLED TRANSPORT

FIELD OF THE INVENTION

This invention generally relates to apparatuses and methods for transportation of multiple vehicles in tandem from one destination to another. The invention may also be used in the field of towing vehicles generally.

BACKGROUND OF THE INVENTION

The economy of the United States, if not of the world, depends to a great extent on fleets of large trucks for the distribution of goods, such as foods, consumer products, durable goods, and even industrial equipment. There are many manufacturers of such trucks, which concern primarily, but are not limited to, class 7 or class 8 over-the-road trucks. Once these trucks are manufactured, they require shipment or transportation either to the carrier or other company for whom the truck was made, or to a dealer who sells or leases these trucks. The most obvious method to transport these trucks is by driving them directly to their destination. This method has disadvantages, at least because each truck requires a driver, who must be paid for his or her services and for whom return transportation must be arranged.

In order to overcome the necessity of a driver for delivering each truck, a variety of techniques have been devised to use a first truck that will carry or tow one or more additional trucks to the desired destination. One example is shown in U.S. Pat. No. 4,555,214. This patent discloses a tow bar that attaches to the fifth wheel of both the towing vehicle and the towed vehicle. The towed vehicle is towed in a rear-ward fashion behind the front vehicle. Using this technique, the towed vehicle is exposed to the full force of the air that is encountered during the tow. Any aerodynamic surfaces of the towed vehicle will be subjected to reverse stresses, i.e., the wind will impose loads on the truck at 180° from the direction expected during the design of the truck. Thus, the roof cap, side fairings, and any additional fairings, such as side and chassis fairings, should be braced or buttressed for the trip. This adds additional cost to the delivery of the truck. In addition, it is not clear that, even using both fifth wheels, the towed truck will have sufficient freedom of movement to be able to rotate slightly during turns.

Another technique is disclosed in U.S. Pat. No. 4,949,985, in which a vehicle is towed or transported while facing forward. The technique involves hoisting the front axle of a towed vehicle onto the rear of a towing vehicle. The technique works well, but one disadvantage is that the forward portion of the towed vehicle must be raised a considerable height in order to mate with a towing saddle that is secured to the towing vehicle. Another disadvantage is that the towing saddle itself is secured to the towing vehicle by means of long U-bolts which extend around and under the vehicle frame members. These frame members are typically elongated C-channels with solid webs facing outward and the hollow portions and flanges of the "C"s facing inwardly.

Some heavy trucks, or truck tractors, have one rear axle and some have a rear axle and an intermediate axle, i.e., an axle at a position intermediate between the front axle and rear axle. When the technique of U.S. Pat. No. 4,949,985 is used, the front axle of the towed vehicle is lifted up, and the truck has an intermediate axle, it is possible that wheels of the intermediate axle will also be lifted off the ground. When this happens it is prudent to take appropriate action to better secure the intermediate axle to the truck or truck frame on which the axle is mounted.

Axles typically include attach to the truck frame by struts, brackets and leaf springs. The truck frame to which the axle is attached typically includes large steel structural members in the form of channels, with a cross-section in the shape of a capital C. Axles, including intermediate axles, are designed to support the weight of the truck or truck tractor in compression or bearing, and the axles clearly are also designed to support side loads. However, when the wheels are lifted off the ground, they place a tensile load on the axle supports. The axle supports, however, may not always be designed to support loads in tension because of other design requirements, such as a reasonable weight for the supports. More support is needed to insure that the intermediate axle is not damaged during towing, while the wheels of the intermediate axle are lifted off the ground. Damage may occur without extra support if the struts or brackets of the intermediate axle are bent or twisted during towing.

In order to prevent such damage, it is common to support the intermediate axle during towing. A large piece of wood such as a 48-inch long piece of hardwood, having a cross section about 6 inches x 8 inches, is placed atop the truck frame, one end of the wood on each side of the truck. A chain is then wrapped around the wood and the axle, on each side of the truck. The chain is typically about seven feet, six inches long, although other lengths may be used. The truck is then towed to its destination and the is released from the towing truck. Since the wood is heavy and cumbersome, it is normally disposed without reuse. The chains may be reused if they are returned to the shipping terminal for use in another tow.

What is needed is a better way to secure the intermediate axle of a towed truck to its frame in order to tow or transport the towed truck. The method should not impose tensile loads on the axle supports and equipment used in the method should be easy to return and reuse. The invention provides such an improved apparatus and method. These and other advantages of the invention, as well as additional inventive features, will be apparent from the description of the invention provided herein.

BRIEF SUMMARY OF THE INVENTION

One aspect is a method of transporting a vehicle. The method includes steps of furnishing a first truck having an axle intermediate to a front axle and a rear axle; placing chains around both sides of the intermediate axle; securing the intermediate axle to a frame of the truck by placing strapping atop the frame and securing the strapping to the chains on both sides of the intermediate axle; tightening the chains; and attaching the truck to a second towing truck.

Another aspect is a method of transporting a truck. The method includes steps of furnishing a truck having an axle intermediate to a front axle and a rear axle, placing a thin protective material atop a frame of the truck and placing strapping atop the protective material; placing chains on both sides of the intermediate axle and securing the chains to the strapping; tightening the strapping; and attaching the truck to a towing truck.

Yet another aspect is a method of transporting a truck. The method includes steps of furnishing a first truck having an axle intermediate to a front axle and a rear axle, placing a thin protective material atop the truck frame, placing strapping atop the protective material, placing chains on both sides of the intermediate axle and securing the chains to the strapping with a clevis on each side of the strapping, and attaching the truck to a second towing truck.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

Figure 1:
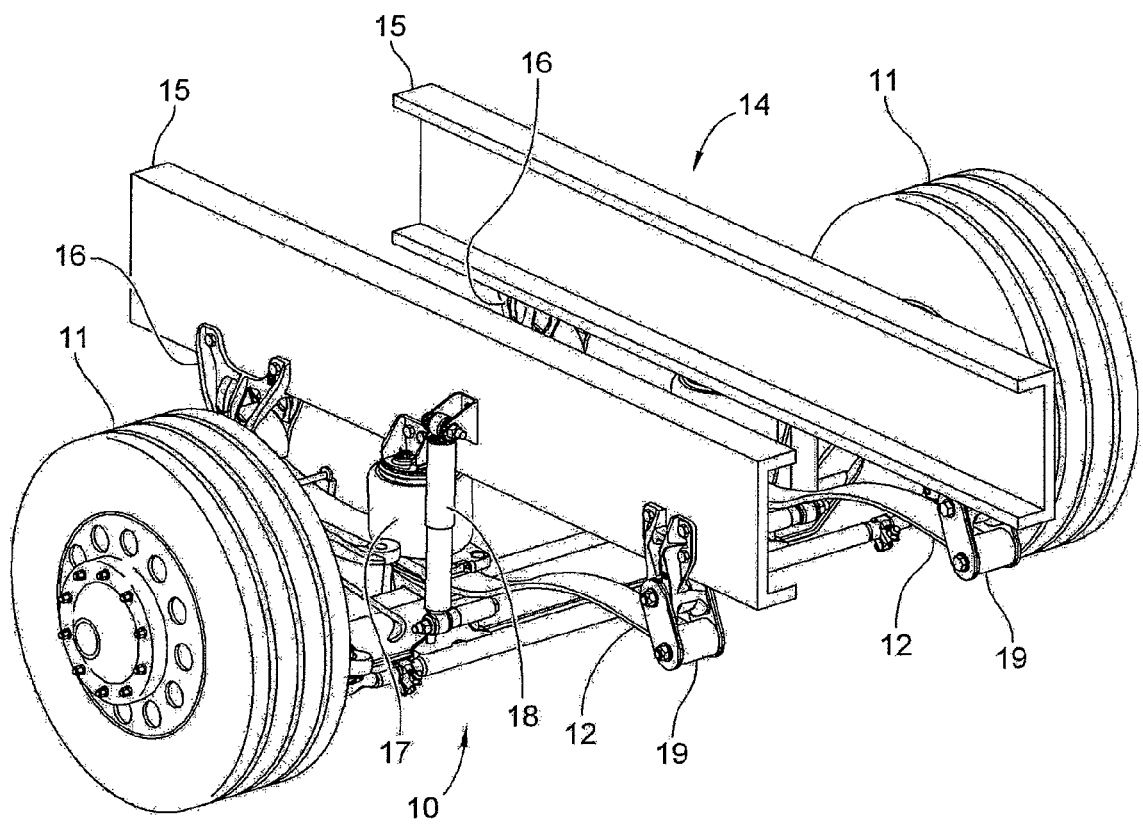
FIG. 1 is an isometric view of a prior art method of securing an intermediate axle to its truck frame.
Figure 2:
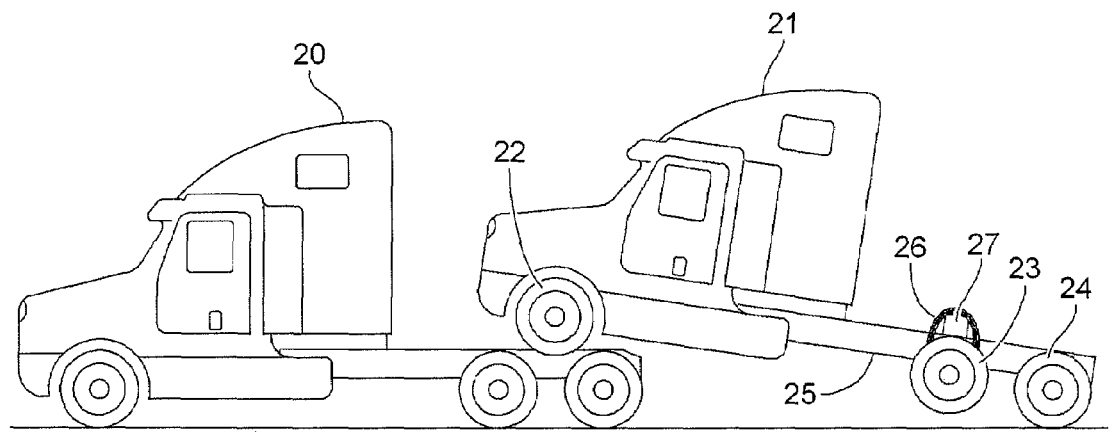
FIG. 2 is a rear isometric view of the prior art method for securing an intermediate axle of a towed vehicle to its truck frame for towing by a towing vehicle.

As noted above, there are many ways to secure a towed truck to a towing truck for transport. One method known in the prior art is depicted in FIGS. 1-2. In this method, the truck to be towed by a towing truck has an intermediate axle 10. The axle has wheels 11 on each side of the axle. As shown in the figures, intermediate axle 10 is secured to truck frame 14 of the towed truck, the truck frame including left and right channels 15. Axle 10 is secured only by two front hanger brackets 16 and two rear shackle brackets 19, which also support leaf springs 12. The axle includes other parts that do not directly support the axle, including air springs 17 and shock absorbers 18. Even this simplified version demonstrates the relatively slender supports used for attaching intermediate axles to a heavy-duty truck.

Because of this relatively light support, intermediate axles of towed vehicles are typically suspended during transport, as depicted in FIG. 2. A towing truck 20 mounts a towed truck 21, with the front wheels 22 and front axle (not shown) supported off the ground and on the towing truck 20. The rear wheels 24 of the towed truck remain on the ground, while the intermediate axle (not shown) and its wheels 23 are suspended in the air. A wood block 27 is typically mounted atop the channels or truck frame 25, and chains 26 on the right and left sides of the frame then are positioned and tightened around the intermediate axle and the wood block to support the intermediate axle while it is being transported.

Figure 3:
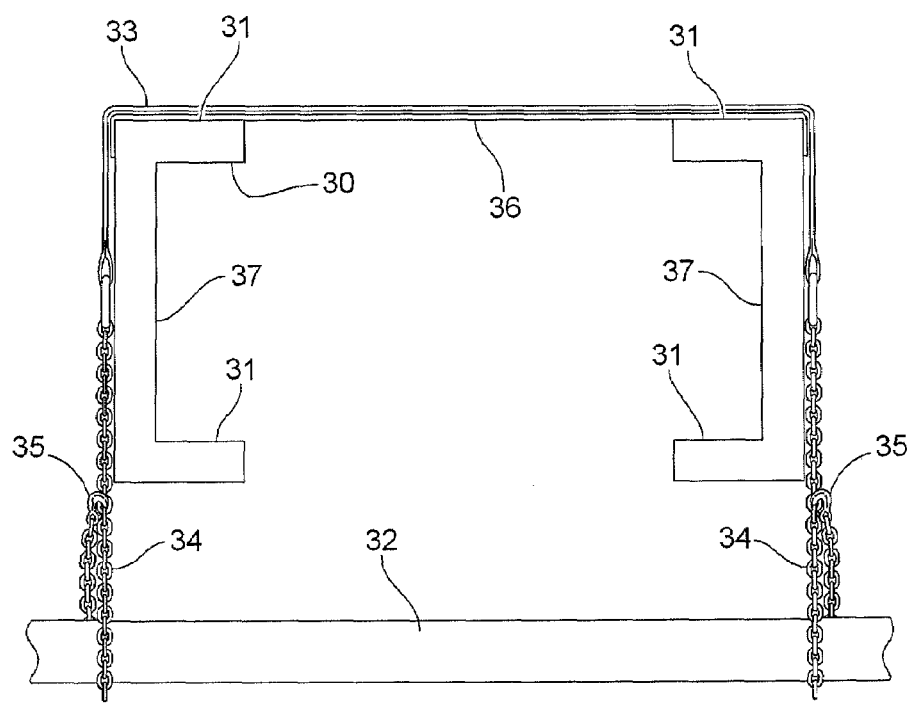
FIG. 3 is a cross-sectional view of a method for securing an intermediate axle to its truck frame for towing the vehicle.

An improved method, and equipment for the method, is depicted in FIG. 3. In this method, no wood block is used atop the truck frame 30 made from structural steel channels with flanges 31 and webs 37. Instead, a layer of protective material 36 is optionally and preferably placed atop the channels. The truck frame occasionally has burrs, sharp edges, or other defects that could damage or weaken the nylon webbing used to suspend the intermediate axle 32 from the truck frame. The protective material helps to protect the nylon webbing 33 that is then placed atop the protective material. Chains 34 are then wrapped around axle 32 and are secured, one end to the other, and to webbing 33, by hooks 35 on either side.

Figure 4:
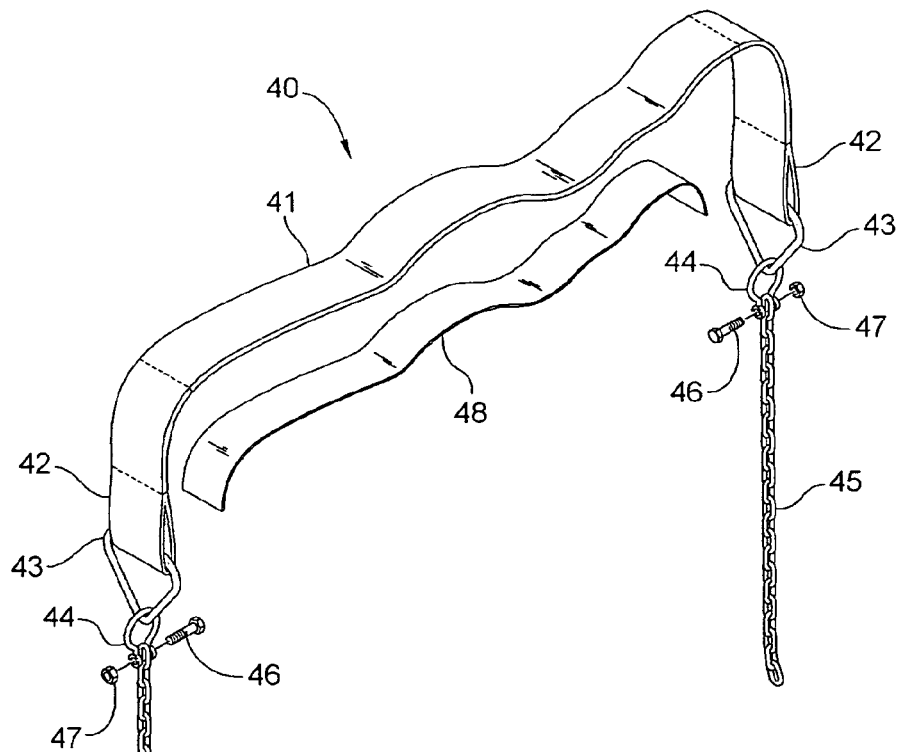
FIG. 4 is an exploded view of equipment useful for a method of securing an intermediate axle of a truck to its truck frame for towing or transporting the truck.

A closer look at how this is accomplished is disclosed in FIG. 4. An apparatus 40 is for supporting an intermediate truck axle by its frame. Apparatus 40 includes webbing 41 with reinforced end portions 42 and connectors 43 attached to the end portions. The apparatus also includes two chains 45, one on each side, with a clevis 44 for attaching the chain to the connector on each side. The connection on each side is completed with a bolt 46 and a nut 47. Protective material 48 may be used under the webbing to protect the webbing from sharp edges, burrs, and other imperfections that could damage or cut the webbing.

The webbing is typically nylon strapping, or other strong, light-weight polymeric webbing material. One supplier of such webbing is Vulcan Chain Corp., Detroit, Mich., maker of chains and webbing for securing cargo and other applications. 4-inch nylon webbing (approximately 4 inches across the web) works satisfactorily. Other materials may also be used, so long as the materials are sufficiently strong for the application. Examples may include but are not limited to: polyester; aramid; rayon; polypropylene (preferably stronger grades); polyethylene, preferably stronger grades such as Spectra® fiber available from Honeywell, Inc.; and cotton.

There are many ways to practice this invention. In one embodiment, thin protective material is placed between the truck frame, typically steel channels, and the webbing used to support the intermediate axle. The protective material may be any useful, inexpensive, and preferably lightweight material, such as polymeric film or paper, such as kraft or corrugated kraft paper. One source of protective films is Surface Guard, Inc., of Aurora, Ill., which manufactures a variety of protective films. While a 3 to 10 mil (0.003 to 0.010 inches) thickness is sufficient for a variety of applications, even thicker materials may be used in this application, such as 0.020 inches, or even up to 0.060, 0.090 or 0.100 inches. Virtually any non-abrasive, reasonably strong, and relatively moisture-resistant material or polymer will be suitable. Examples include polyethylene and polypropylene.

In another embodiment, substantially the same equipment is used as shown in FIG. 4, but a shorter nylon webbing, about 16 inches to about 20 inches long is used, along with a shorter chain, about 24 inches to about 36 inches long. Other lengths of both the webbing and the chain may be used. In this embodiment, the webbing is slung around one of the two truck frame members, and the chain is slung around one end of the axle, and then the chain is secured to the triangle or triangles with the clevis and a bolt or other fastener. The same shorter equipment is used on the other truck frame member and the other side of the axle, thus securing both sides of the axle to the frame. Protective material is used to protect the webbing from the truck frame members.

Embodiments of the present invention contemplate the use of large C-shaped channels as frame rails in vehicles used for truck transport. It is possible that other shapes may be used, such as I-beams, wide-flange beams, or hollow, rounded-square tubing. The apparatus and method described above for securing an intermediate axle to a truck frame will work as well for truck frames made in the same general shape that uses these alternate constructions, i.e., structural beams or tubing on both sides of the truck.

Figure 5:
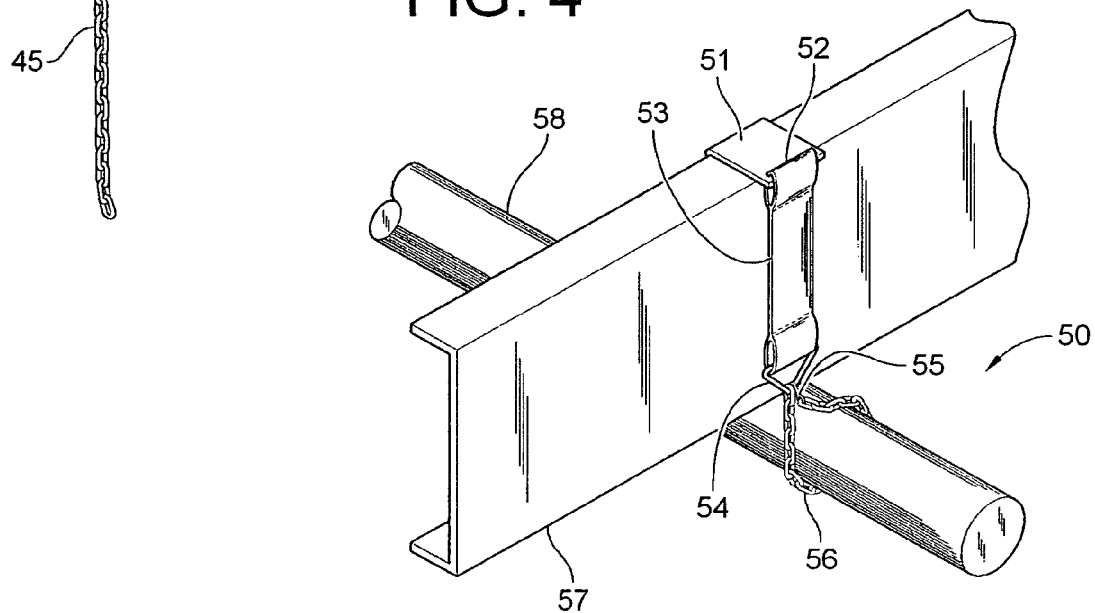
FIG. 5 depicts another embodiment of equipment for securing an intermediate axle to a truck frame.

Another embodiment uses the same dual-equipment concept mentioned above, but uses J-clamps secured to the truck frame members rather than having the webbing go around the truck frame members. In FIG. 5, the securing equipment 50 for one side of the axle 58 includes a J-clamp 51 with an orifice 52. The J-clamp 51 mounts to a flange of a truck frame member 57. A strap 53 made of nylon or other webbing material runs through orifice 52 and is secured to a triangle 54 or other termination. A clevis 55 and a chain 56 are secured to the triangle, preferably with a bolt or other fastener, and they in turn secure the intermediate axle 58 to frame member 57. J-clamp 51 is preferably about 4 inches long, slightly longer than the truck frame, and about 3-5 inches wide. The hook or open portion of the J-clamp is secured to the edge of the flange of the frame 57, as shown. The elongated orifice 52 of the J-clamp is about 3 inches wide, to accommodate wide strap 53. Strap 53 is preferably 3-4 inches wide and about 6-8 inches long. The chain is about 24-36 inches long. Components of other sizes may be used. Protective material is used to protect the webbing from the frame.

Figure 6:
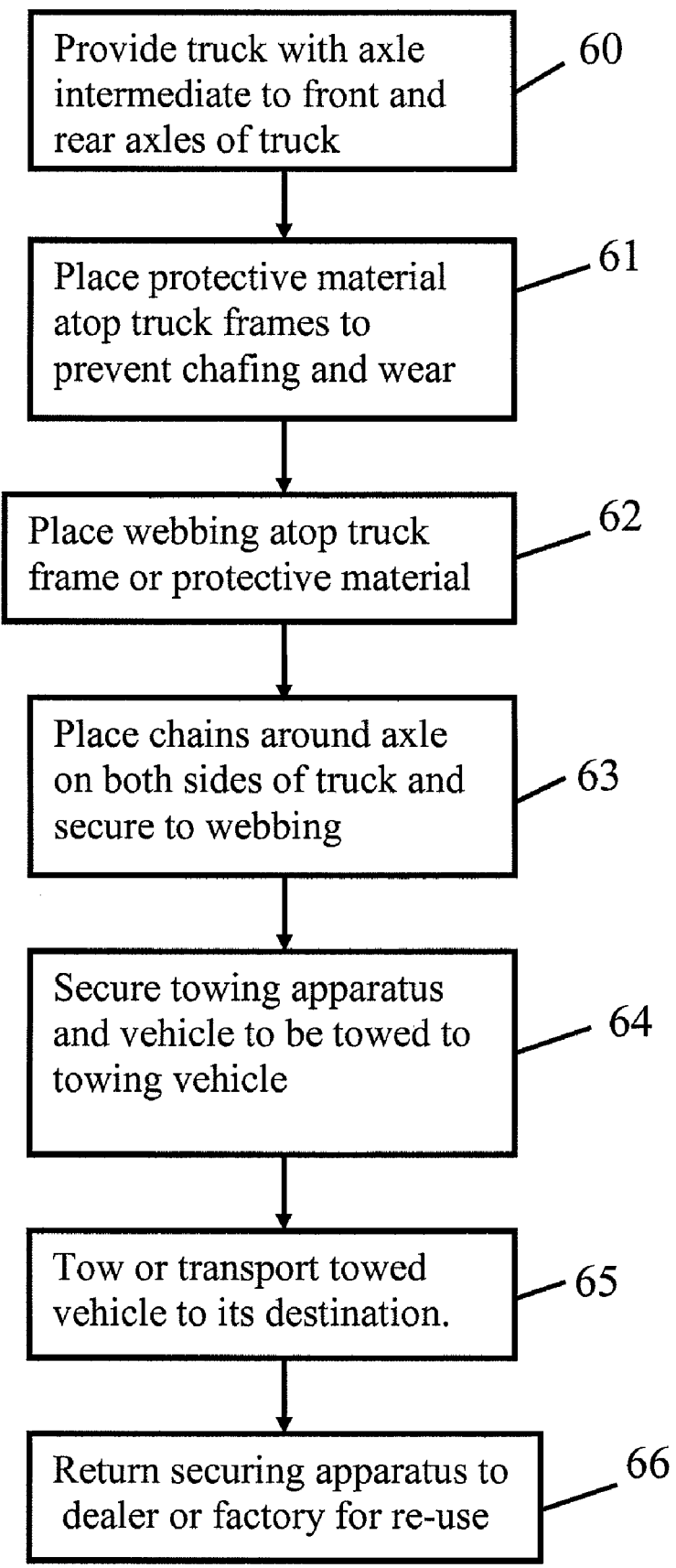
FIG. 6 is a flow chart for a method of securing an intermediate axle of a truck to the frame of the truck.

The method described above is also presented herein, using the flowchart of FIG. 6. In this method, one step 60 is to provide a truck for towing, the truck having an axle intermediate between the front and rear axles of the truck. Another step 61 is to place inexpensive and lightweight protective material atop the frame of the truck to prevent chafing and wear of the other components used to support the intermediate axle. Another step 62 is to place webbing atop the truck frame, or if protective material is used, to place the webbing atop the protective material that has been placed atop the truck frame. Another step 63 is to place chains around the intermediate axle on both sides of the truck and to secure the chains to the webbing.

The next step 64 is to secure the towing apparatus and the vehicle to be towed to the towing vehicle and then to tow or transport 65 the towed vehicle to its destination. The webbing is lightweight, since it is a polymeric or cloth-type material, and the chains are smaller and lighter than the long chains used in previous methods. In this method, it is not necessary to use four-foot long timbers, six inches by eight inches in cross section to protect the chains and the security of the installation. Instead, a very sturdy webbing is used, and thinner, lighter materials are used to protect the webbing. Thus, it is much easier to transport the apparatus used to return 66 the intermediate axle back to the assembly plant, factory, or dealership from which the trucks were shipped. This allows the manufacturer or dealer to re-use the apparatus in an economical fashion without using, returning or replacing large, heavy timbers.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of transporting a truck, the method comprising steps of:
   furnishing a first truck having an axle intermediate to a front axle and a rear axle;
   placing chains around both sides of the intermediate axle;
   securing the intermediate axle to a frame of the truck by placing strapping atop the frame and securing the strapping to the chains on both sides of the intermediate axle;
   tightening the chains; and
   attaching the truck to a second towing truck.

2. The method of claim 1, where the strapping is nylon webbing.

3. The method of claim 1, wherein the strapping is nylon webbing about 4 inches across and about 50 inches long and is secured to the sides of the intermediate axle by chains about 36 inches long.

4. The method of claim 1, wherein the chains remain below a top flange of the frame.

5. The method of claim 1, further comprising a step of placing a thin protective material atop the truck frame before placing the strapping atop the frame.

6. The method of claim 1, further comprising transporting the truck with the towing truck.

7. The method of claim 1, wherein the front axle of the first truck is loaded onto or is supported by the towing truck and wheels of the rear axle remain in contact with the ground.

8. The method of claim 1, wherein wheels of the intermediate axle are about 8-10 inches off a ground surface.

9. The method of claim 1, wherein the webbing is made from material selected from the group consisting of nylon, polyester, aramid, polyethylene, polypropylene, and cotton.

10. The method of claim 1, wherein the chains are secured to the strapping by a clevis on each side of the strapping.

11. The method of claim 1, wherein the step of securing is accomplished with two straps, one on each side of the axle.

12. The method of claim 1, wherein the step of securing is accomplished with two straps, one on each side of the axle, and wherein the straps are secured to the frame with J-clamps.

13. A method of transporting a truck, the method comprising steps of:
   furnishing a truck having an axle intermediate to a front axle and a rear axle;

placing a thin protective material atop the truck frame;
placing strapping atop the protective material;
placing chains on both sides of the intermediate axle and securing the chains to the strapping; and
attaching the truck to a towing truck.

14. The method of claim 13, further comprising transporting the second vehicle.

15. The method of claim 13, wherein the protective material is selected from the group consisting of a film and a paper.

16. The method of claim 13, further comprising returning the strapping and the chains to terminal, assembly plant, or dealership, for re-use.

17. A method of transporting a truck, the method comprising steps of:
furnishing a first truck having an axle intermediate to a front axle and a rear axle;
placing a thin protective material atop the truck frame;
placing strapping atop the protective material;
placing chains on both sides of the intermediate axle and securing the chains to the strapping with a clevis on each side of the strapping; and
attaching the truck to a second towing truck.

18. The method of claim 17, further comprising towing the first truck.

19. The method of claim 17, wherein material for the strapping is selected from the group consisting of nylon, polyester, aramid, polyethylene, polypropylene, and cotton.

20. The method of claim 17, wherein the thin protective material is from about 0.010 inches thick to about 0.0125 inches thick.

21. The method of claim 17, wherein the thin protective material is selected from the group consisting of a film and a paper.

* * * * *